(12) United States Patent
Todd

(10) Patent No.: US 6,785,682 B2
(45) Date of Patent: Aug. 31, 2004

(54) DATA PROCESSING SYSTEM, METHOD AND COMPUTER PROGRAM PRODUCT

(75) Inventor: Stephen James Todd, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 391 days.

(21) Appl. No.: 09/792,603

(22) Filed: Feb. 23, 2001

(65) Prior Publication Data

US 2001/0047352 A1 Nov. 29, 2001

Related U.S. Application Data

(60) Provisional application No. 60/184,902, filed on Feb. 25, 2000.

(51) Int. Cl.[7] ............................ G06F 17/30; G06F 17/00
(52) U.S. Cl. ....................... 707/100; 707/101; 707/102; 715/500.1; 715/514
(58) Field of Search ......................... 707/1–3, 100–102, 707/104.1; 715/514, 500.1, 523, 526, 524; 713/181

(56) References Cited

U.S. PATENT DOCUMENTS

| | | | | |
|---|---|---|---|---|
| 5,668,897 A | * | 9/1997 | Stolfo | 382/283 |
| 5,699,522 A | * | 12/1997 | Shimizu et al. | 709/203 |
| 5,802,357 A | * | 9/1998 | Li et al. | 707/2 |
| 6,052,693 A | * | 4/2000 | Smith et al. | 707/104.1 |

OTHER PUBLICATIONS

"LEXX—A programmable structured editor," *IBM Journal of Research and Development*, vol. 31, No. 1, 1987, pp. 73–80.

* cited by examiner

*Primary Examiner*—Alford Kindred
(74) *Attorney, Agent, or Firm*—Winstead, Sechrest & Minick

(57) ABSTRACT

The present invention relates to a data processing system, method and computer program product for improving the operation of, for example, a message broker. By not constructing messages from stored data in advance of a demand, the invention reduces the processing overhead. A further aspect provides for maintaining a data structure for a messaging system having an application capable of producing an output structured message in a prescribed format and capable of adding a received structure message to a data structure contained within a storage medium of the system. The steps followed are: receiving a first structured message in a first format; the first structured message being associated with the output structured message in the prescribed format; adding the first structured message in the first format to the data structure; receiving a second structured message in a second format; the second structured message being associated with the output structured message in the prescribed format; and adding the second structured message in the second format to the data structure such that the first and second structured messages are stored non-contiguously within the data structure.

18 Claims, 5 Drawing Sheets

DATA PROCESSING SYSTEM, METHOD AND COMPUTER PROGRAM PRODUCT

CROSS REFERENCE TO RELATED APPLICATION

This application claims priority and all other benefits under 35 U.S.C. §120 of prior filed co-pending US patent application U.S. Ser. No. 60/184,902, filed Feb., 25, 2000 and is incorporated herein by reference thereto.

FIELD OF THE INVENTION

The present invention relates to a data processing system and method and, more particularly, to a lazy messaging system and method.

BACKGROUND OF THE INVENTION

A flexible message broker system may in response to a standard message content interface call be required to perform a merge operation in relation to an existing structured message (e.g. data base tuple) and a further or additional item of data or information. Conventionally, a message broker receives a message in the so-called wire-format, that is, as a string of binary ones and zeros. The process of merging a wire-format message with an additional item of data typically either comprises the steps of converting the message from a wire-format into, for example, a XML format message, performing the merge operation and converting the XML format message back into a wire-format message or processing the message in the wire-format by identifying where within the wire-format message the additional data could be incorporated, merging the additional data, also in a wire-format, into the wire-format message at the appropriate location within the wire-format message. The above process is clearly computationally expensive and represents a significant processing overhead within a messaging system. Such an overhead becomes less bearable in circumstances where there is a relatively high probability that the newly created merged message will not be utilised by another application or has a relatively limited life-time. There is a significant overhead in creating messages that become out of date relatively rapidly. Furthermore, a message may be created in anticipation of a request from a message broker which may never materialise.

It is an object of the present invention to mitigate at least some of the problems of the prior art.

SUMMARY OF THE INVENTION

Accordingly, a first aspect of the present invention provides a method for maintaining a data structure for a structured messaging system, the structured messaging system comprising an application capable of producing an output structured message in a prescribed format and capable of adding a received structured message to a data structure contained within a storage medium of the system; the method comprising the steps of receiving a first structured message in a first format; the first structured message being associated with the output structured message in the prescribed format;

adding the first structured message in the first format to the data structure;

receiving a second structured message in a second format; the second structured message being associated with the output structured message in the prescribed format; and adding the second structured message in the second format to the data structure such that the first and second structured messages are stored non-contiguously within the data structure. Preferably, additional information is added to the data structure for providing an association between the first and second structured messages Preferably, an embodiment provides a method further comprising the step of constructing and outputting the output structured message in response to a query received by the application. It will be appreciated that producing the output message only when removes the need to process the first and second received structured message to render them in a format that complies with the prescribed format for the output message.

Preferably, an embodiment provides a method in which the step of producing comprises the step of forming the output structured message using derivations of the first and second structured messages to produce a physically contiguous output message. It will be appreciated by those skilled in the art that a calling application which requests the output message may use the output message for processing internal to that calling application or may, in turn, use the message to produce a further output message for a still further application.

It will be appreciated that in some instances, the output message may not require all data contained within either of the first and second messages. Suitably, an embodiment provides a method further comprising the step of selecting at least a portion of at least one of the first and second structured message to form part of the output structured message. In particular at the extreme, an application using the services of the embodiments of the present invention may often wish to retrieve the value of just a single field from a complex structured message; said complex structured message being the result of merging several structured messages input to the described system.

Often the prescribed format for an output message may not correspond to the message format in which the first or second message was received. Suitably, an embodiment provides a method in which the step of producing comprises translating at least a part of at least one of the first and second structured messages from a respective format to the prescribed format. Advantageously, the processing overhead of the prior associated with constructing the output message immediately upon of the first and second structured message or at least in advance of a request for or need to publish the output message in the prescribed format is removed.

An embodiment provides a method in which the step of outputting comprises the step of outputting the output structured message as non-contiguous portions derived from at least one of the first and second structured messages. It will be appreciated that such a lazy output of the output message has the advantage that the whole of the output message does not need to be formed in advance of servicing a request for the output message.

Accordingly, a second aspect of the present invention provides a data processing method for a data processing system comprising at least one application capable of outputting a message relating to first and second data contained within a data structure held within a memory of the data processing system; the method comprising the steps of storing the first and second data separately within data structure; and constructing a response to a query using the separately stored first and second data only in response to receiving such a query.

It will be appreciated that a query and hence a corresponding output message may require only a small fraction of the data contained within a structured message.

Alternatively, the whole of the data contained within a stored message, in effect, the whole of a message, may be required in responding to a query. Accordingly, embodiments provide a method in which the step of constructing comprises the steps of collating at least a portion of the first data and at least a portion of the second data and converting said portions of the first and second data to a prescribed message format.

Still further embodiments provide a method in which the step of constructing further comprises the step of creating a message containing at least a portion of the first and second data.

Yet other embodiments may provide a method in which the step of constructing comprises the step of transmitting at least a portion of the first data to the at least one application and subsequently transmitting at least a portion the second data to the at least one application.

Advantageously, embodiments of the present invention by storing a message and any additional data intended to merged with the message in a fragmented form and only performing a merge operation in response to a query involving the stored message and the additional data avoid the processing overheads typically incurred in the prior art should such a query not be forthcoming. Therefore, the processing overheads of a message system or a flexible message broker can be significantly reduced.

A third aspect of the present invention provides a data processing system including at least one application capable of outputting a message relating to first and second data contained within a data structure held within a memory of the data processing system; the system comprising means for storing the first and second data separately within a data structure; and means for constructing a response to a query using the separately stored first and second data only in response to receiving such a query.

A fourth aspect of the present invention provides a computer program product for a data processing system comprising at least one application capable of outputting a message relating to first and second data contained within a data structure held within a memory of the data processing system; the computer program product comprising a storage medium having stored thereon computer program code means for storing the first and second data separately within data structure; and computer program code means for constructing a response to a query using the separately stored first and second data only in response to receiving such a query.

BRIEF DESCRIPTION OF THE DRAWINGS

Embodiments of the present invention will now be described, by way of example only, with reference to accompanying drawings in which.

DETAILED DESCRIPTION OF THE PREFERRED EMBODIMENTS

Figure 1:
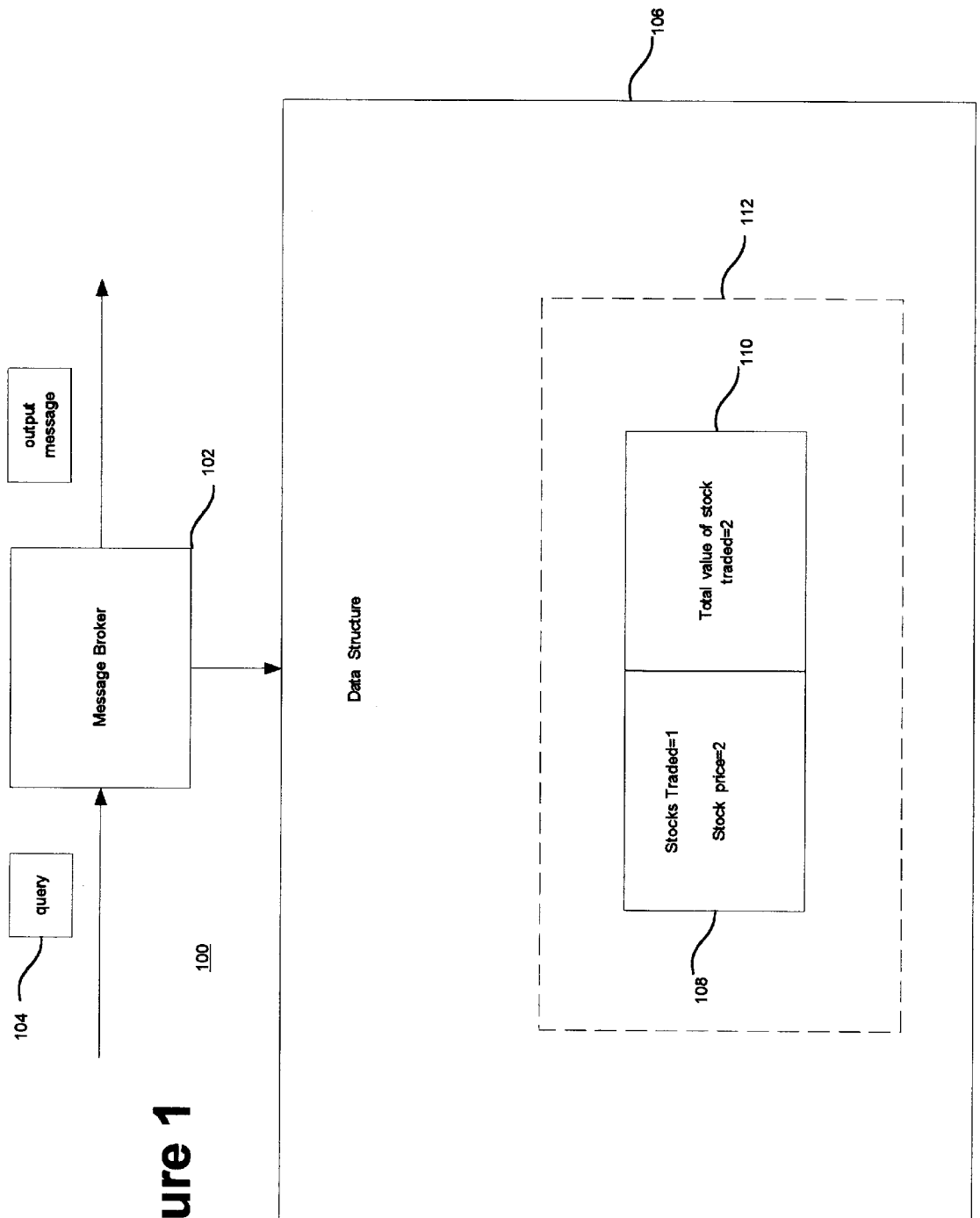
FIG. 1 illustrates a flexible message broker according to the prior art.

Referring to FIG. 1 there is shown a data processing system 100 comprising a flexible message broker 102 which can output information in response to a query 104; the information being derived from data contained within, for example, a data structure 106 such as, for example, in preferred embodiments, a tree structure or a data base in response to receipt of a message. It will be appreciated that the system may be a message broker system such as described in the MQSeries Integrator V.2 product available from IBM Corporation or as described in the document entitled "MQSeries Integrator Version 2.0 Technical White Paper", incorporated herein by reference for all purposes, also available from IBM Corporation.

Preferably, the data contained within the data within the data structure 106 is stored in its native form, that is, in the wire-format.

Conventionally the data contained within the data structure is merged within additional of incremental units of data. Additionally messages may be merged together and stored. Assume that message broker 102 is arranged to produce and output (o/p), in response to an appropriate query, the total monetary value of the volume of a traded stock having received in a first message 108 the number of stocks traded together with the stock value of each trade. An additional field 110 for the message would be created which holds the monetary value of the total volume of the traded stock. The additional information may be required to be forwarded in response to an appropriate query by the flexible message broker together with the stock value and stock volume. Suitably, the prior art, in response to receiving the stock value and the volume of stocks traded at that price calculates the total monetary value of the traded volume of stock and merges the additional calculated data with the original message containing the stock price and traded volume data to produce a merged message 112. The merged message 112 is then stored for later possible retrieval. As indicated above, the pre-emptive calculation and merging of message or information that may be of interest at some time in the future represents a significant overhead.

Figure 2:
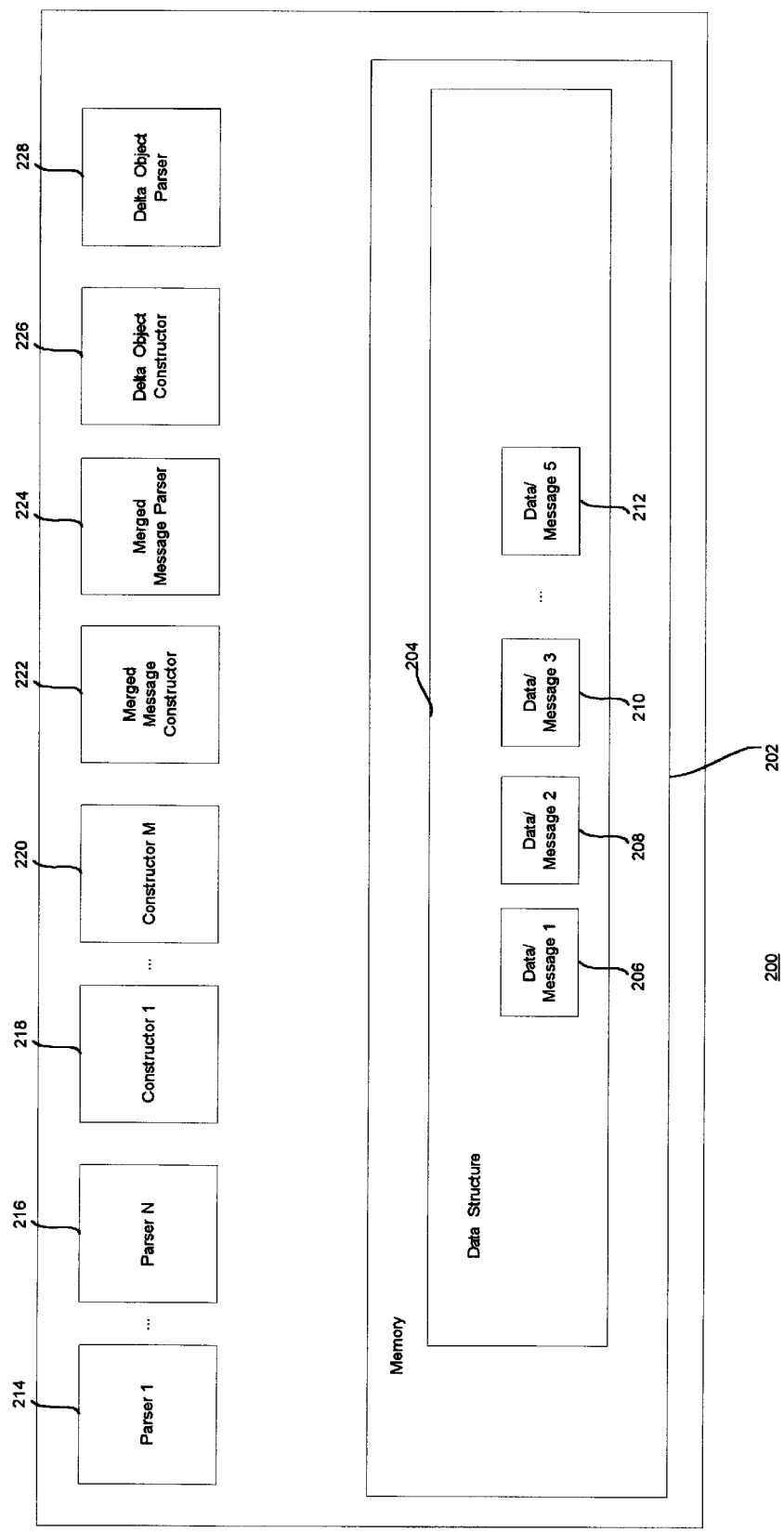
FIG. 2 depicts schematically the functional elements of a data processing system according to a first embodiment.

FIG. 2 shows a data processing system 200 according to a first embodiment of the present invention for reducing the above-mentioned processing overhead. The data processing system 200 comprises a memory 202 for storing data in a data structure 204 for storing a plurality of messages or data 206 to 212. The data processing system additionally comprises, in a preferred embodiment, a number of message parsers 214 to 216, a number of constructors 218 to 220, a merged message constructor 222 and a merged message parser 224 and, optionally, a delta object constructor 226 and a delta object parser 228. A parser 214 to 216 is used to interpret messages 206 to 212 or data stored within the data structure 204. Preferably, a parser is provided for each format of message of interest. For example, a wire-format parser and an XML format parser may be provided for interpreting message received in the wire-format and XML format respectively. It will be appreciated that a parser may be implemented using Message Dictionary comprising a Message Repository Manager, (MRM), a Resource Manager and a Message Translation Interface (MTI). The definition and format of a message, with identification of the field and elements within a message model template is known as a Message Model. The MRM uses the MQSeries Integrator V2 Control Centre tool to define and maintain any Message Models used within the embodiments of the present invention and stores appropriate information within a MRM data base. The Message Models within the MRM can handle many forms of messages such as XML message formats and byte-oriented record structures from C or COBOL sources. A constructor 218 to 220 is used to a received message or data to the data structure. A merged message constructor 222 is used to construct a merged message in response to a query relating to the two separate items of data or separate messages 206 to 212 stored within the data structure 204. A merged message parser is provided for outputting the merged message produced by the merged message constructor 222 in a prescribed format. Preferred embodiments additionally provide a delta object constructor 226 for storing a relatively small data or messages and associating that data with relatively larger data or messages and a delta object parser 228 for interpreting the association between the relatively small data and the relatively large message or data.

Figure 3:
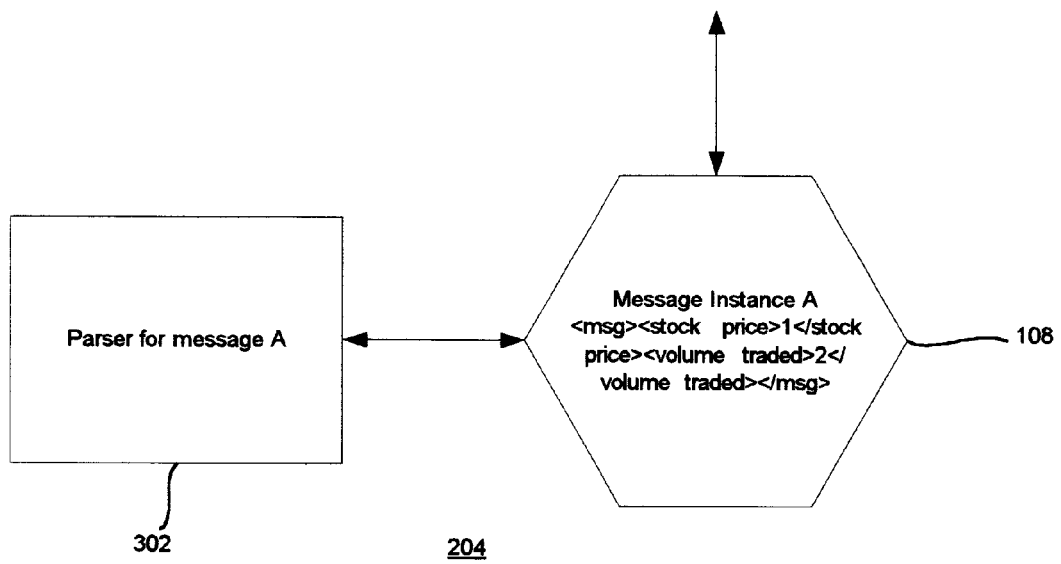
FIG. 3 illustrates a first data structure for storing a message for use by a flexible message broker together with processing elements of the data processing system of FIG. 2 that manipulate the stored data.

Referring to FIG. 3 there is shown an embodiment of a data structure 300 together with the relationship with the above-described functional elements for storing the first message 108. The received message 108 may be stored in, for example, the wire-form of, the XML<msg><stock price>1</stock price><volume traded>2</volume traded></msg>, within a node or at a leaf of the data structure 204 together with a link to an associated message parser 302 for interpreting the first message.

Figure 4:
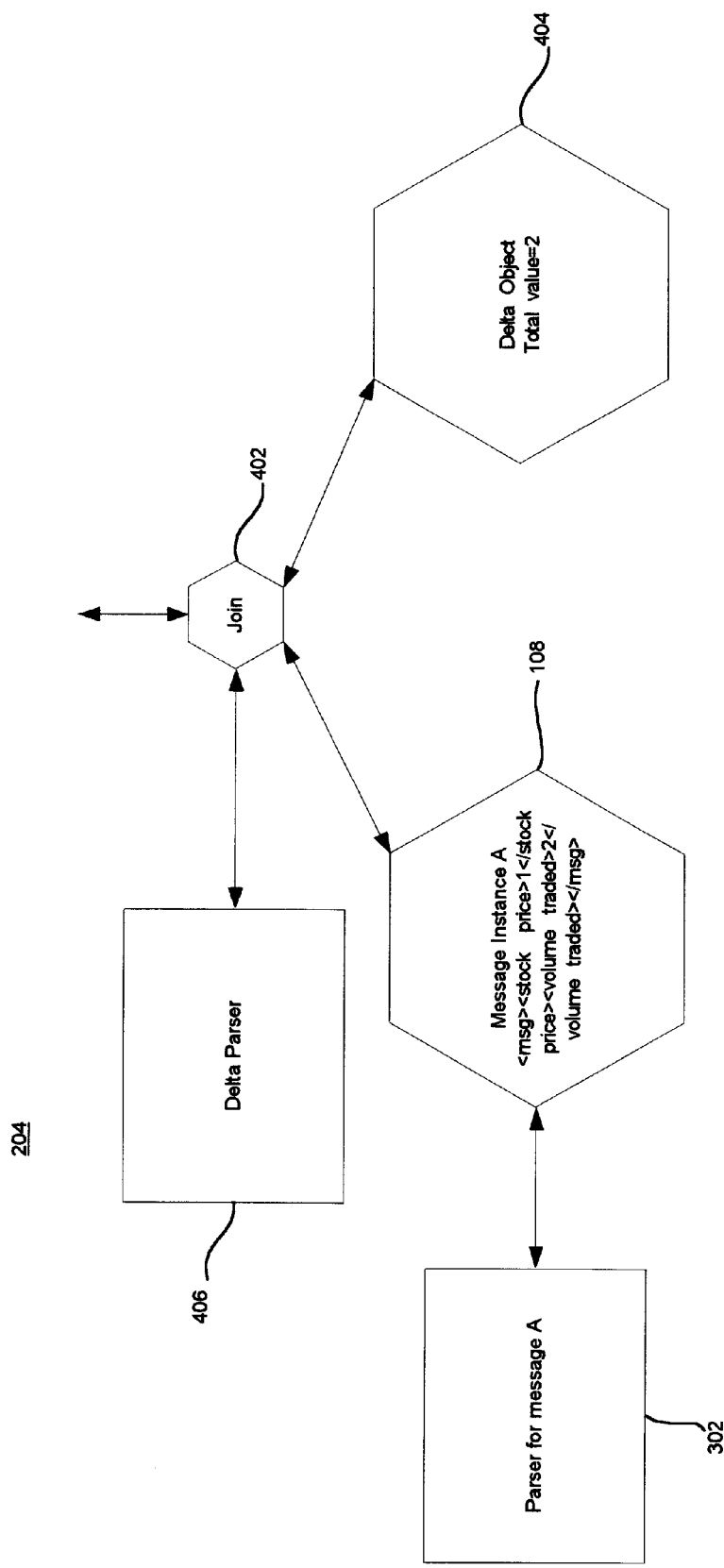
FIG. 4 shows a second data structure for storing the message together with an additional item of data together with corresponding processing elements of the system of FIG. 2.

Upon receipt of the first message 108 the message broker calculates the total monetary value of stocks traded using the two values <stock price> and <volume traded> and adds the calculated value to the data structure using a constructor 218 to 220. However, since the calculated value is relatively small, in terms of the number of bytes required to represent the calculated value as compared to the length of the stored message 108, the calculated value is added to the data structure using a delta object constructor 226. In a preferred embodiment, a delta constructor is reserved for internal operations, whereas a constructor other than a delta constructor is used to construct a message that is intended to be output by the data processing system in, for example, a wire format or some other format supported by the Message models. It will be appreciated that the wire-format output by the data processing system may be a different wire-format to that in which the message or any element of a message is currently stored. The result of adding the calculated value to the data structure is shown in FIG. 4. FIG. 4 depicts the data structure 204 together with the associated functional elements. The data structure comprises the first message 108 together with the associated message parser 302, a node 400 storing the calculated value, a join node 402 for associating the calculated value with the first message 108 and a delta object parser 406 for interpreting the data contained within delta node 400 the nodes connected to the join node 402. It can be appreciated, in contrast to the prior art, that the second message 112 comprising the original message 108 and the newly calculated value 110 is not physically constructed as a contiguous message data structure thereby saving processing overheads.

It will be appreciated that the storage of structured messages or data received by the message broker may cause a change in the underlying data structure which (a) simply associates or adds one message to another message, (b) replaces a previously stored message with a newly received message, (c) updates a currently stored message with a newly received message or (d) creates a new message within the data structure.

Figure 5:
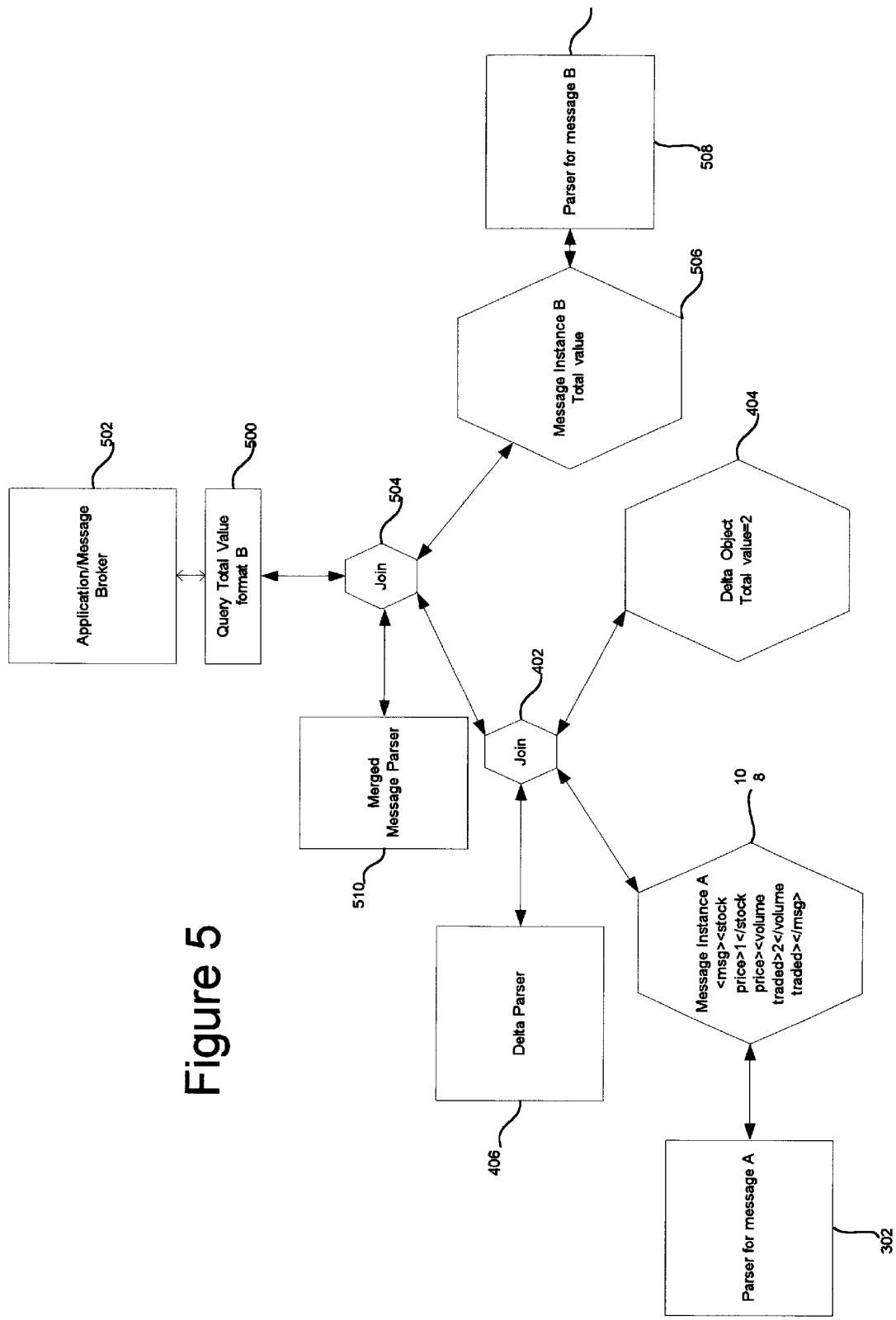
FIG. 5 depicts a third data structure and processing elements for providing a response to a query from the flexible message broker.

Referring to FIG. 5 there is shown the data structure 204 or generic processing together with the associated functional elements for responding to a query 500 from an application 502 which requires information to be contained within a second message, such as the above mentioned second message 112 in a prescribed format suitable for that application 502. The data structure further comprises a second join node 504 which is used to add a further data storage node 506 that contains the requested message, that is, the response to the query, in the prescribed format. The prescribed format requires the use an associated parser 508 which is used to interpret the second message 112. The newly added join node has an associated merged message parser for constructing the second message from the nodes connected to the newly added join node 504 according to the received query.

It will be appreciated that the addition of a new node for storing the second message was undertaken since the requested format of the message was different to the format in which the first message 108 and the additional data 400 were stored. If the first message and the additional data were both stored in the requested format, the addition of the new node 506, associated message parser 508 would not have been appropriate.

It will be appreciated that the above described lazy messaging can be extended to encompass lazy transmission of a response to such a query. In the above embodiments, the second message was described has having been constructed and transmitted in a fully constructed form to the requesting application. However, embodiments can be realised in which the response to the query 500, in contrast to providing a response to the query in the form of a completely constituted message such as message 112, is provided in a piecemeal fashion, that is, the data held at the nodes of the data structure required to provide a response to the query are transmitted, preferably after appropriate conversion to comply with the prescribed format of the response, to the application 500 a node at a time. Hence, the data contained within the first message 108 may be transmitted prior to the data held node 400 being transmitted.

One skilled in the art will also appreciated that it is desirable to preserve the semantics of the received messages and the merged messages when constructing a reply to a query. For example, the new value added to the delta node 400 in the above embodiments may (a) merely form a new field of the second message, as shown in FIG. 1, (b) replace any previous total stock traded value, even if such a previous value does not exist, (c) require a previous stock value to exist and replace the previous stock value at a corresponding position within the message previously held be the earlier stock value, (d) Update an old field, in-situ, if the old field is present, other append the update to the end of a message, and (e) require that there be no previous value and place the new value at the end of the newly constructed message.

It can be appreciated from the above that storing the data in a disjointed fashion, that is, omitting the construct new messages from the disparate data until necessary saves a significant amount of data processing.

Although the above embodiments have been described with reference to the construction of an output message in a prescribed format using complete stored structured messages, the present invention is not limited thereto. Embodiments can be realised in which only portions of a stored structured message are used in producing the output message. Still further embodiments may be arranged to interleave portions of various messages to produce the output message.

I claim:

1. A method for maintaining a data structure, organized as a logical tree structure, for a structured messaging system, the system comprising an application capable of producing an output structured message in a prescribed format and adding a received structured message to a data structure contained within a storage medium of the system; the method comprising the steps of:

receiving a first structured message in a first format, the first structured message being associated with the output structured message in the prescribed format;

adding the first structured message in the first format to the data structure as a first leaf of the logical tree structure;

receiving a second structured message in a second format, the second structured message being associated with the output structured message in the prescribed format; and adding the second structured message in the second format to the data structure as a second leaf of the logical tree structure, wherein a merge operation of the first and second structured messages, represented by a join node, is recorded in the logical tree structure.

2. A method as claimed in claim 1 further comprising the step of producing and outputting the output structured message in response to a query received by the application.

3. A method as claimed in claim 2 in which the step of producing comprises the step of forming the output structured message from physically contiguous derivations of the first and second structured messages.

4. A method as claimed in claim 3 further comprising the step of selecting at least a portion of at least one of the first and second structured message to form part of the output structured message.

5. A method as claimed in claim 2 in which the step of producing comprises translating at least a part of at least one of the first and second structured messages from a respective format to the prescribed format.

6. A method as claimed in claim 2 in which the step of outputting comprises the step of outputting the output structured message as non-contiguous portion of message derived from at least one of the first and second structured messages.

7. A data processing system for maintaining a data structure, organized as a logical tree structure, for a structured messaging system, the system comprising an application capable of producing an output structured message in a prescribed format and adding a received structured message to a data structure contained within a storage medium of the system; the system comprising:

means for receiving a first structured message in a first format, the first structured message being associated with the output structured message in the prescribed format;

means for adding the first structured message in the first format to the data structure as a first leaf of the logical tree structure;

means for receiving a second structured message in a second format, the second structured message being associated with the output structured message in the prescribed format; and means for adding the second structured message in the second format to the data structure as a second leaf of the logical tree structure, wherein a merge operation of the first and second structured messages, represented by a join node, is recorded in the logical tree structure.

8. A system as claimed in claim 7 further comprising means for producing and outputting the output structured message in response to a query received by the application.

9. A system as claimed in claim 8 in which the means for producing comprises means for forming the output structured message from physically contiguous derivations of the first and second structured messages.

10. A system as claimed in claim 9 further comprising means for selecting at least a portion of at least one of the first and second structured message to form part of the output structured message.

11. A system as claimed in claim 8 in which means for producing comprises translating at least a part of at least one of the first and second structured messages from a respective format to the prescribed format.

12. A system as claimed in claim 8 in which the means for outputting comprises means for outputting the output structured message as non-contiguous portion of message derived from at least one of the first and second structured messages.

13. A computer program product for maintaining a data structure, organized as a logical tree structure, for a structured messaging system, the system comprising an application capable of producing an output structured message in a prescribed format and adding a received structured message to a data structure contained within a storage medium of the system; the computer program product comprising a storage medium having stored thereon:

computer program code means for receiving a first structured message in a first format, the first structured message being associated with the output structured message in the prescribed format;

computer program code means for adding the first structured message in the first format to the data structure as a first leaf of the logical tree structure;

computer program code means for receiving a second structured message in a second format, the second structured message being associated with the output structured message in the prescribed format; and computer program code means for adding the second structured message in the second format to the data structure as a second leaf of the logical tree structure, wherein a merge operation of the first and second structured messages, represented by a join node, is recorded in the logical tree structure.

14. A computer program product as claimed in claim 13 further comprising computer program code means for producing and outputting the output structured message in response to a query received by the application.

15. A computer program product as claimed in claim 14 in which the computer program code means for producing comprises computer program code means for forming the output structured message from physically contiguous derivations of the first and second structured messages.

16. A computer program product as claimed in claim 15 further comprising computer program code means for selecting at least a portion of at least one of the first and second structured message to form part of the output structured message.

17. A computer program product as claimed in claim 14 in which means for producing comprises translating at least a part of at least one of the first and second structured messages from a respective format to the prescribed format.

18. A computer program product as claimed in claim 14 which the computer program code means for outputting comprises computer program code means for outputting the output structured message as non-contiguous portion of message derived from at least one of the first and second structured messages.

* * * * *